(12) United States Patent
Sato

(10) Patent No.: US 6,270,151 B1
(45) Date of Patent: Aug. 7, 2001

(54) BODY STRUCTURE FOR VEHICLE

(75) Inventor: Manabu Sato, Kanagawa-ken (JP)

(73) Assignee: Nissan Motor Co., Ltd., Yokohama (JP)

(*) Notice: Subject to any disclaimer, the term of this patent is extended or adjusted under 35 U.S.C. 154(b) by 0 days.

(21) Appl. No.: 09/637,869

(22) Filed: Aug. 15, 2000

(30) Foreign Application Priority Data

Sep. 8, 1999 (JP) .................................................. 11-254746

(51) Int. Cl.⁷ .................................................. B62D 25/08
(52) U.S. Cl. ..................................... 296/203.02; 296/194
(58) Field of Search .................................. 296/192, 194, 296/203.01, 203.02, 204, 189, 29, 30, 70, 72; 180/90

(56) References Cited

U.S. PATENT DOCUMENTS

| | | | |
|---|---|---|---|
| 5,125,715 | * 6/1992 | Kijma | 296/189 |
| 5,127,704 | * 7/1992 | Komatsu | 296/204 |
| 5,713,625 | * 2/1998 | Takahashi et al. | 296/194 |
| 5,988,734 | * 11/1999 | Longo et al. | 296/203.01 |
| 6,095,592 | * 8/2000 | Nakatani | 296/188 |

FOREIGN PATENT DOCUMENTS

| | | | |
|---|---|---|---|
| 61-275024 | * 12/1986 | (JP) | 296/203.02 |
| 3-10975 | * 1/1991 | (JP) | 296/203.02 |
| 7-309254 | 11/1995 | (JP) . | |
| 10-264862 | 10/1998 | (JP) . | |

* cited by examiner

*Primary Examiner*—Stephen T. Gordon
*Assistant Examiner*—Patricia Engle
(74) *Attorney, Agent, or Firm*—McDermott, Will & Emery

(57) ABSTRACT

A vehicle body structure is provided to simplify both positioning and temporary fixing in assembling a dash panel 1 to a reinforcement member 4. The vehicle body structure has engagement parts 21 arranged on both sides of the reinforcement member 4 in a vehicle width direction, for engagement of the member 4 with the dash panel 1. In process of assembling, the dash panel 1 is pinched between the engagement parts 21 through both ends of the panel 1 in the vehicle width direction.

10 Claims, 6 Drawing Sheets

BODY STRUCTURE FOR VEHICLE

BACKGROUND OF THE INVENTION

1. Field of the Invention

The present invention relates to a body structure for vehicle. Particularly, it relates to the (vehicle) body structure around a dash panel which separates a vehicle cabin and a front compartment or a rear compartment of the vehicle.

2. Description of the Related Art

Generally, when assembling a plurality of body panel members provided by press working to construct a vehicle body, the positioning of the respective body panel members is carried out by attaching them to body jigs prescribing the relative positions of the members. Further, the welding operation of the panel members to be welded is performed on condition that the members are pinched by respective clamping jigs for temporarily holding (see Japanese Unexamined Patent Publications Nos. 10-264862 and 7-309254).

In recent years, it has been adopted to construct the vehicle body by plural panel members consisting of extrusions or castings of lightweight metal, such as aluminum alloy, in place of the press moldings, in view of making the lightweight vehicle body compatible with its rigidity. For example, there is developed a vehicle body structure where a dash panel separating the vehicle cabin and the front compartment (or the rear compartment) consists of an extrusion having an improved rigidity. In the structure, the extrusion is provided with a closed sectional structure having inner and outer walls and obtained by extruding the above lightweight metal to the vehicle's width direction. The so-constructed dash panel is reinforced by a reinforcement member which is made of a casting of lightweight metal and connected to the under face of the dash panel.

However, the above-mentioned positioning jigs and the clamping jigs have been still required to connect the dash panel with the reinforcement member in spite of such the measures for the lightweight vehicle body compatible with its rigidity. It means that the above-mentioned assembling form causes enormous number of positioning and clamping jigs to be required every sort of vehicles and every process. Consequently, with the addition of installation cost and steps of setting the jigs, the labor cost is apt to increase disadvantageously.

SUMMARY OF THE INVENTION

Under such a circumstance, it is an object of the present invention to provide a vehicle body structure by which it is possible to properly position the dash panel constructed by an extrusion of lightweight metal and the reinforcement member constructed by a casting of lightweight metal and also possible to temporarily and properly hold the dash panel and the reinforcement member without using any positioning or clamping jig.

According to the invention, the above-mentioned object is accomplished by a vehicle body structure for vehicle, comprising:

a dash panel to be arranged between a vehicle cabin for passengers and an outside of the vehicle cabin, the dash panel being made of an extrusion of a lightweight metal in a width direction of the vehicle to have a structure of closed sections, the dash panel having both an inner wall positioned inside of the vehicle cabin and an outer wall positioned outside the vehicle cabin;

a reinforcement member to be arranged under the dash panel to reinforce the dash panel from its underside, the reinforcement member being made of a casting as a result of casting a lightweight metal and configured to interpose both ends of the dash panel in the width direction of the vehicle between both sides of the reinforcement member in the width direction of the vehicle; and engagement parts each provided between each of the ends of the dash panel and the reinforcement member, for engagement of the reinforcement member with the dash panel, thereby positioning the reinforcement member and the dash panel mutually and fixing the dash panel to the reinforcement member temporarily.

According to the invention, there is also provided a vehicle comprising:

a dash panel to be arranged between a vehicle cabin for passengers and an outside of the vehicle cabin, the dash panel being made of an extrusion of a lightweight metal in a width direction of the vehicle to have a structure of closed sections, the dash panel having both an inner wall positioned inside of the vehicle cabin and an outer wall to be positioned outside the vehicle cabin;

a reinforcement member to be arranged under the dash panel to reinforce the dash panel from its underside, the reinforcement member being made of a casting of a lightweight metal and configured to interpose both ends of the dash panel in the width direction of the vehicle between both sides of the reinforcement member in the width direction of the vehicle; and engagement mechanisms for positioning the reinforcement member and the dash panel mutually and fixing the dash panel to the reinforcement member temporarily, each of the engagement mechanisms being arranged between each of the ends of the dash panel and the reinforcement member.

Furthermore, the above-mentioned object is also accomplished by a method of assembling the above vehicle body structure of the invention, the method comprising:

piling the dash panel on the reinforcement member;

positioning the dash panel and the reinforcement member mutually, thereby putting the dash panel between both sides of the reinforcement member in the width direction of the vehicle;

sliding the dash panel on both side of the reinforcement member; and engaging both ends of the dash panel in the width direction of the vehicle with the reinforcement member through the engagement parts, thereby temporarily fixing the dash panel on the reinforcement member.

DESCRIPTION OF THE PREFERRED EMBODIMENT

An embodiment of the present invention will be described below, with reference to the drawings.

Figure 1:
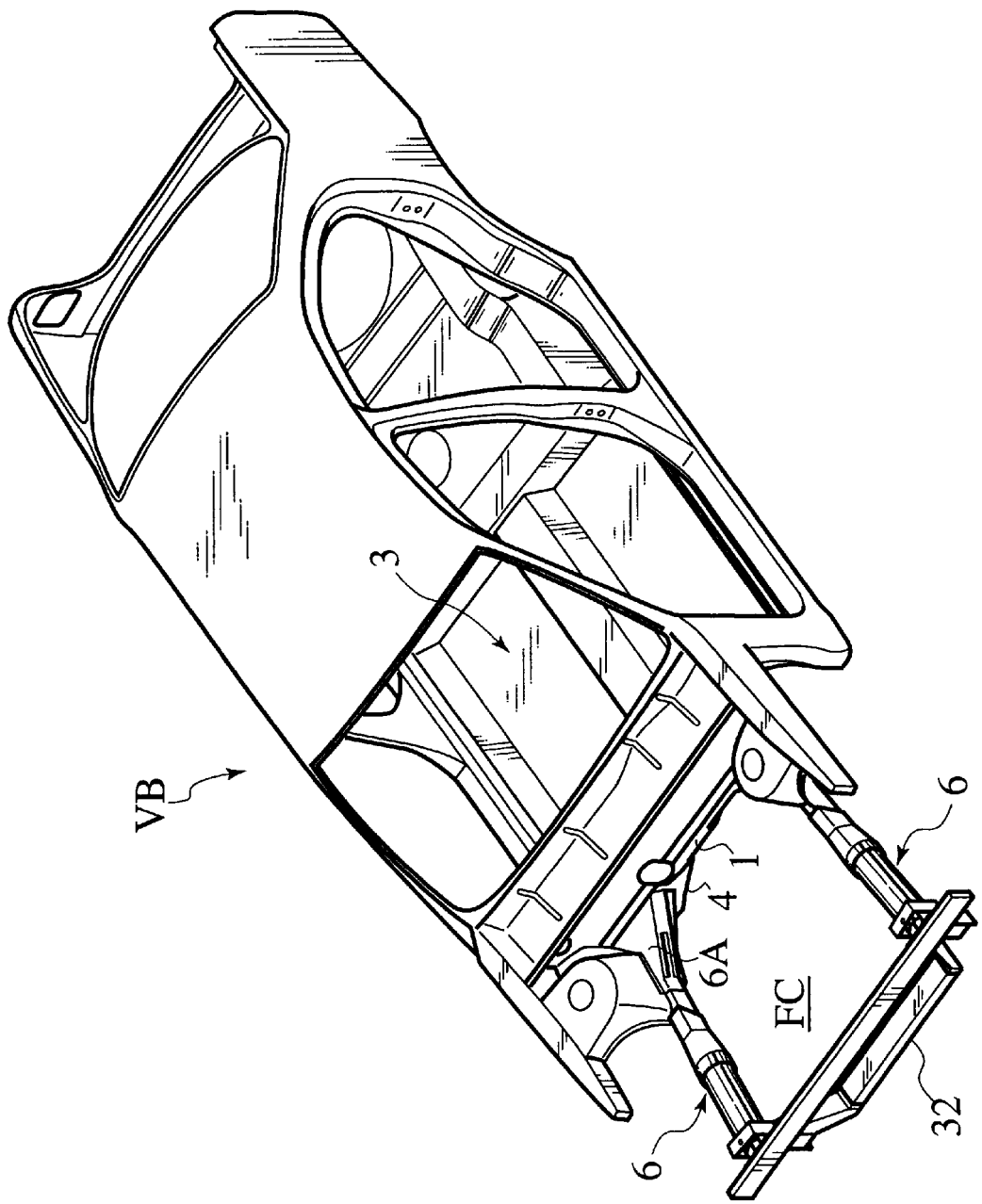
FIG. 1 is a perspective view of the overall outward appearance of a vehicle body to which the present invention is to be applied.

FIG. 1 illustrates a vehicle body VB which includes a dash panel (also known as dash cross member) 1 and a reinforcement member 4 constituting the vehicle body structure of the invention. In the shown state, the dash panel 1 is connected with the front end of a floor panel 3. On both sides of the dash panel 1 in a direction along the width of the vehicle body VB, there are provided a pair of front side members 6 which project in front. The leading ends of the front side members 6 are together connected with a first cross member 32 extending along the direction along the width of the vehicle body VB. Note that this direction will be referred as "vehicle width direction" or "width-direction", hereinafter.

Figure 2:
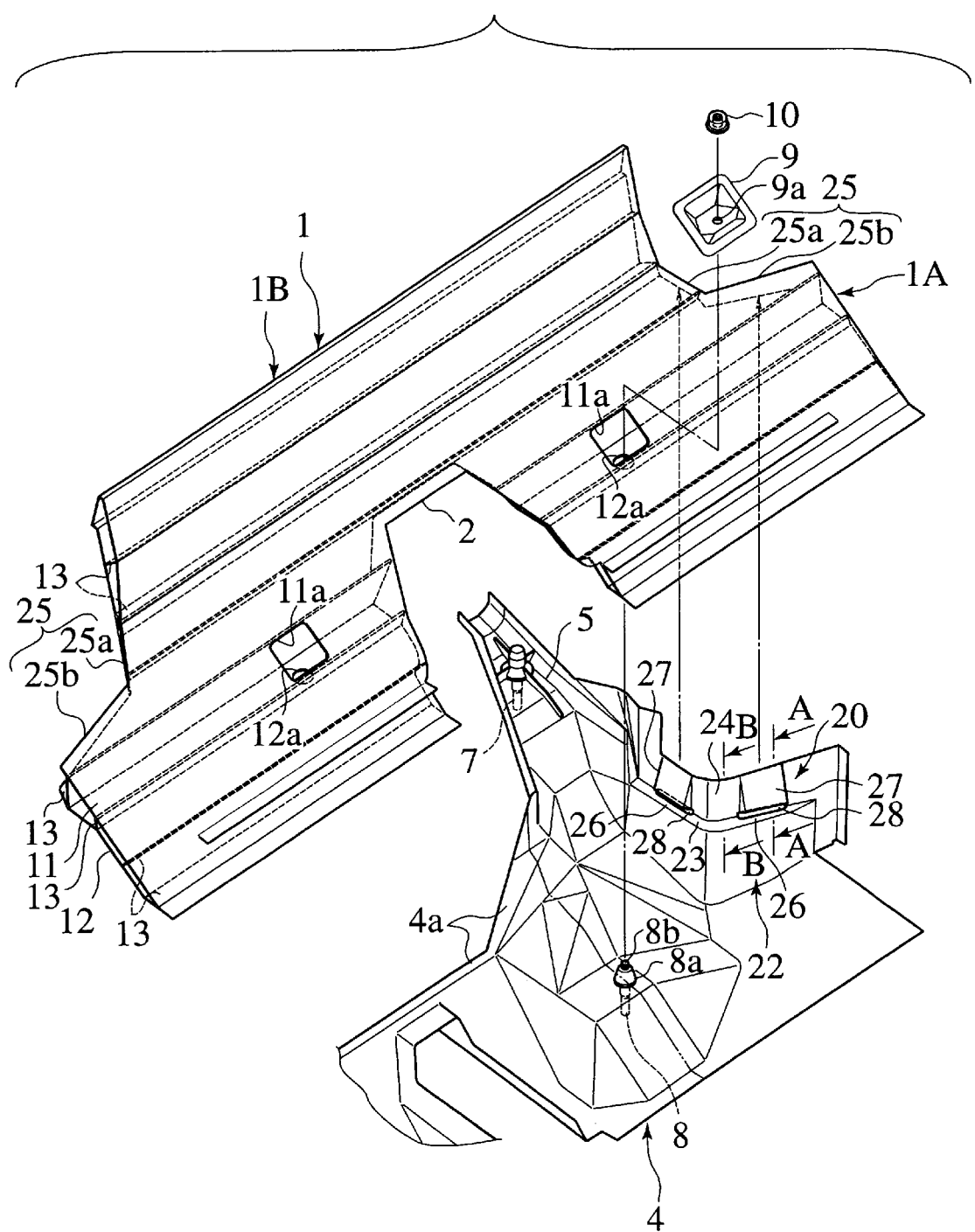
FIG. 2 is an exploded perspective view showing a dash panel and a reinforcement member in accordance with one embodiment of the invention.
Figure 3:
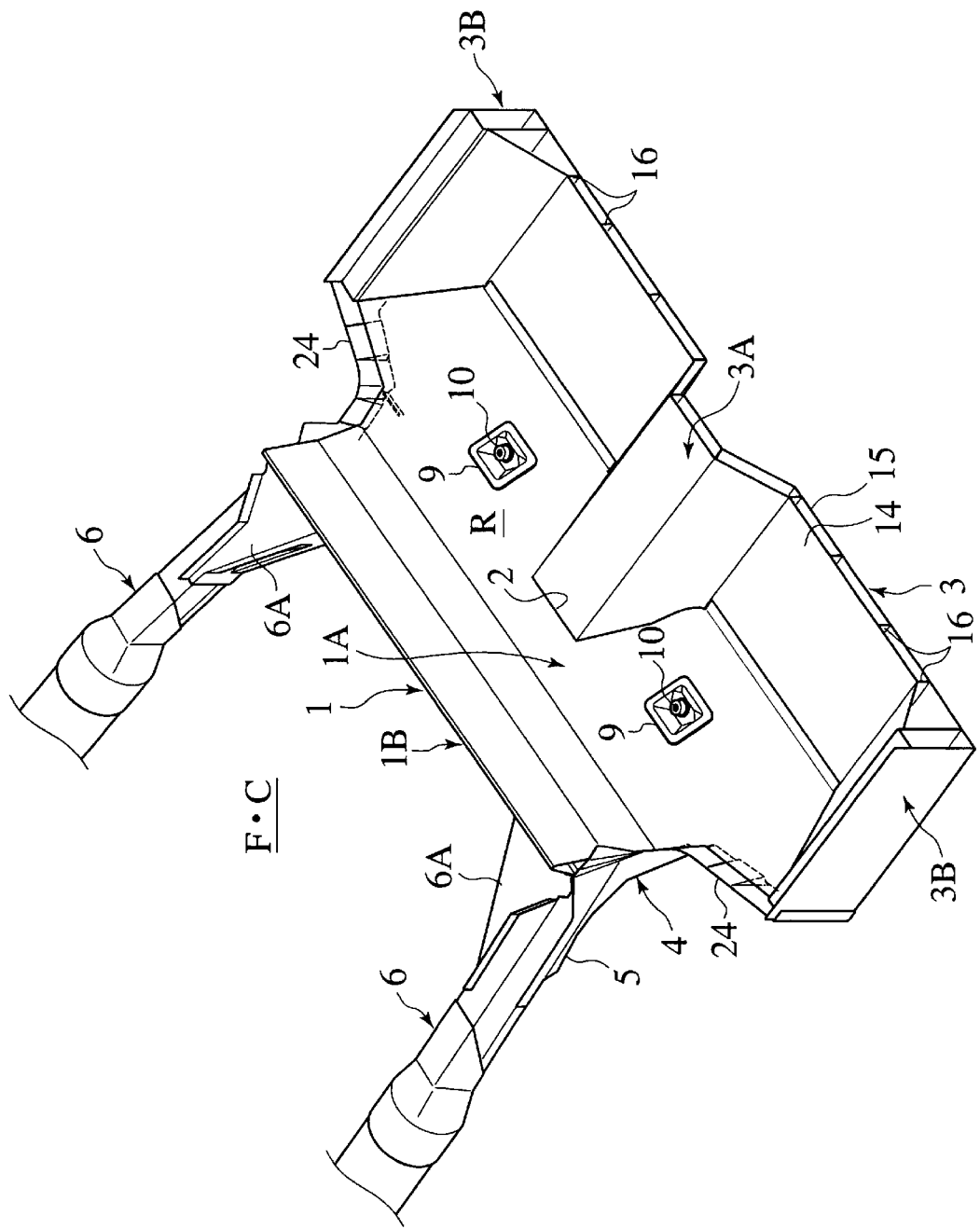
FIG. 3 is a perspective view of the dash panel and the reinforcement member of FIG. 2, showing their assembled condition.

FIGS. 2 and 3 show the dash panel 1 which defines a front compartment FC for accepting a not-shown automotive power unit (e.g. engine) in front of a vehicle cabin R. The dash panel 1 includes an inclined toe board 1A and a vertical wall part 1B rising generally perpendicularly from the board 1A.

The dash panel 1 has a tunnel fitting part (notch) 2 arranged at the center of the toe board 1A in the vehicle width direction, for fitting with a tunnel part 3A of the floor panel 3. On condition that the tunnel part 3A of the floor panel 3 is fitted into the notch 2 and the front end of the floor panel 3 overlaps with the rear part of the toe board 1A, the dash panel 1 is fixed to the floor panel 3 by welding.

The reinforcement member 4 is joined to the underside of the dash panel 1, extending from the toe board 1A to the vertical wall part 1B. The reinforcement member 4 is provided, on left and right sides thereof, with a pair of arm parts 5 which extend forward. As shown in FIG. 3, respective rear ends of the above front side members 6 and a pair of braces 6A are together welded to the arm parts 5 of the reinforcement member 4.

According to the embodiment, the dash panel 1 can be provided by an extrusion of lightweight metallic material, such as aluminum alloy, in the vehicle width direction. By the extrusion, the dash panel 1 is formed with a closed sectional structure having an inner wall 11 and an outer wall 12. Interposed between the inner wall 11 and the outer wall 12 are a plurality of rib walls 13 which also extend to the vehicle width direction thereby enhancing the rigidity of the panel 1 itself.

In the embodiment, the floor panel 3 is also obtained by extruding the similar lightweight metallic material in a direction of both in front and in the rear of the vehicle body VB. Similarly, the floor panel 3 is provided with a closed sectional structure having an inner wall 14, an outer wall 15 and a plurality of rib walls 16. Further, a pair of side sills 3B are formed integrally with both sides of the panel 3, respectively. Note the above direction will be referred to "vehicle front/behind direction" or "front/behind-direction", hereinafter.

A casting of the above lightweight metallic material constitutes the reinforcement member 4. The member 4 is provided, on its each side in the vehicle width direction, with a pair of suspension mount bolt 7, 8 which project downward. Being partially inserted into the casting, the suspension mount bolt 7 is positioned in the vicinity of the front end of each arm part 5, while the suspension mount bolt 8 is positioned at the main part of the reinforcement member 4. These bolts 7, 8 are connected with a not-shown suspension member for supporting a front suspension.

The rear suspension mount bolt 8 has a tapered locating pin 8a formed to project into the vehicle cabin R and a screw part 8b formed on the end of the locating pin 8a. In assembling, the locating pin 8a of the bolt 8 is inserted into a locating hole 12a in the outer wall 12 of the dash panel 1. While, a lid-shaped retainer plate 9 is fitted to an opening 11a in the inner wall 11 of the dash panel 1. The screw part 8b of the bolt 8 is inserted into a through hole 9a in the retainer plate 9 and further tightened by a nut 10 in screw engagement. In this way, the rear end of the suspension member is firmly fastened by the walls 11, 12 of the dash panel 1.

The reinforcement member 4 is provided, on its both sides in the vehicle width direction, with engagement parts (clip parts) 21 for pinching both ends of the dash panel 1 in the vehicle width direction (two parts 21 on one side shown in FIG. 2). The engagement parts 21 serve to position the reinforcement member 4 and the dash panel 1 mutually and retain the dash panel 1 on the reinforcement member 4 temporarily.

In detail, the reinforcement member 4 has positioning parts 22 arranged on both ends of the member 4 in the vehicle width direction (only one shown in the figure). Each positioning part 22 consists of a shelf portion 23 for mounting the dash panel's end in the vehicle width direction and a flange portion 24 rising from the shelf portion 23. On each side in the vehicle width direction, the above engagement parts 21 are arranged in the flange portion 24 and also between the shelf portion 23 and the flange portion 24.

On both sides of the dash panel 1 in the vehicle width direction, substantially L-shaped notches 25 are respectively defined in the dash panel 1 to extend from the upper side of the toe board 1A to the top end of the vertical wall part 1B, corresponding to respective wheel-housing structures (not shown) of the vehicle. Corresponding to the L-shaped notches 25, the positioning parts 22 are also formed to have substantially L-shaped profiles in plan view. On each side of the vehicle in the vehicle width direction, two engagement parts 21 are arranged in respective positions corresponding to an edge 25a in the vehicle width direction and another edge 25b in the vehicle front/behind direction, both edges 25a, 25b defining the L-shaped notch 25.

Figure 4:
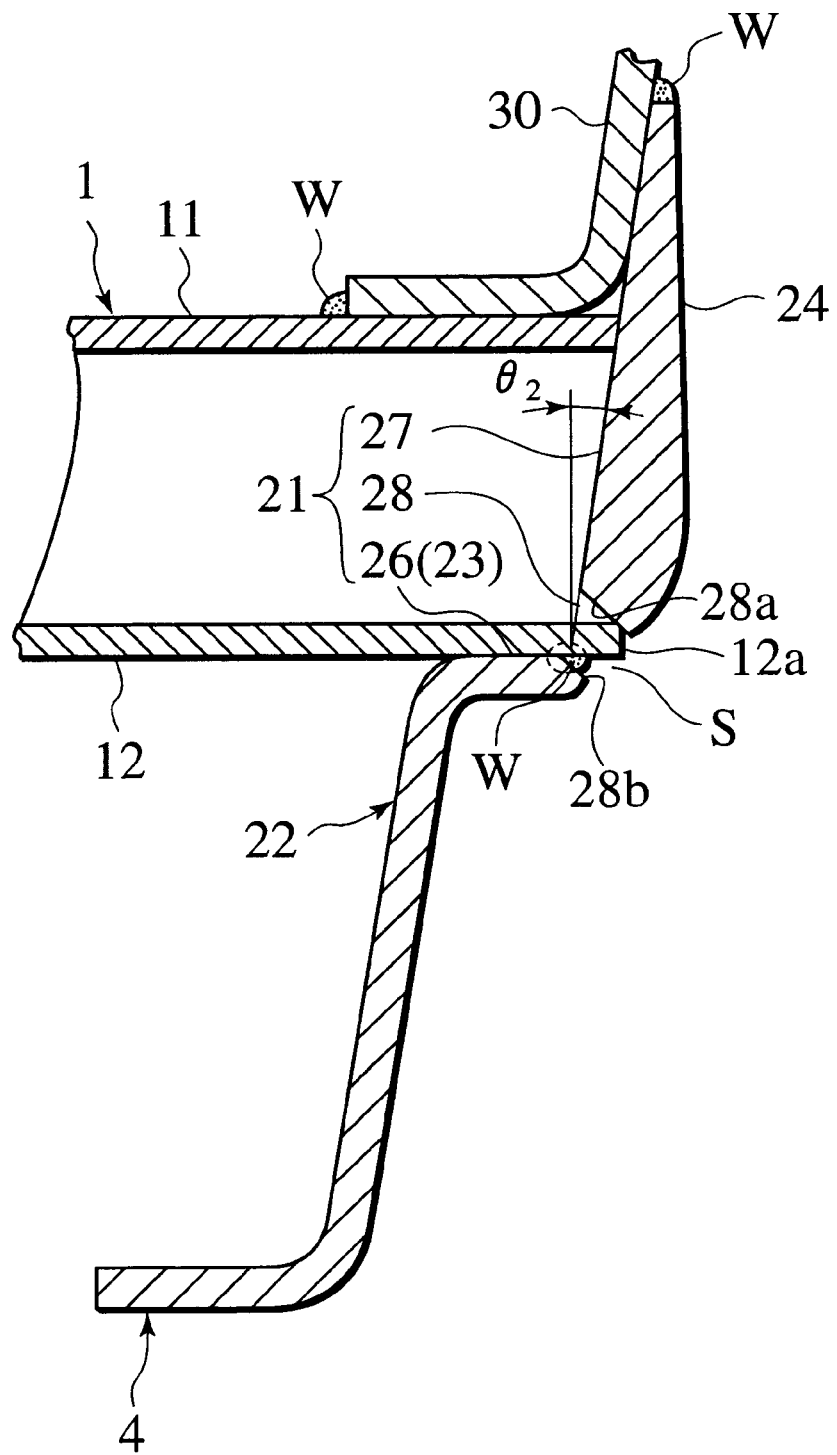
FIG. 4 is a sectional view of the dash panel and the reinforcement member in the assembled condition, taken along a line A—A of FIG. 2.
Figure 5:
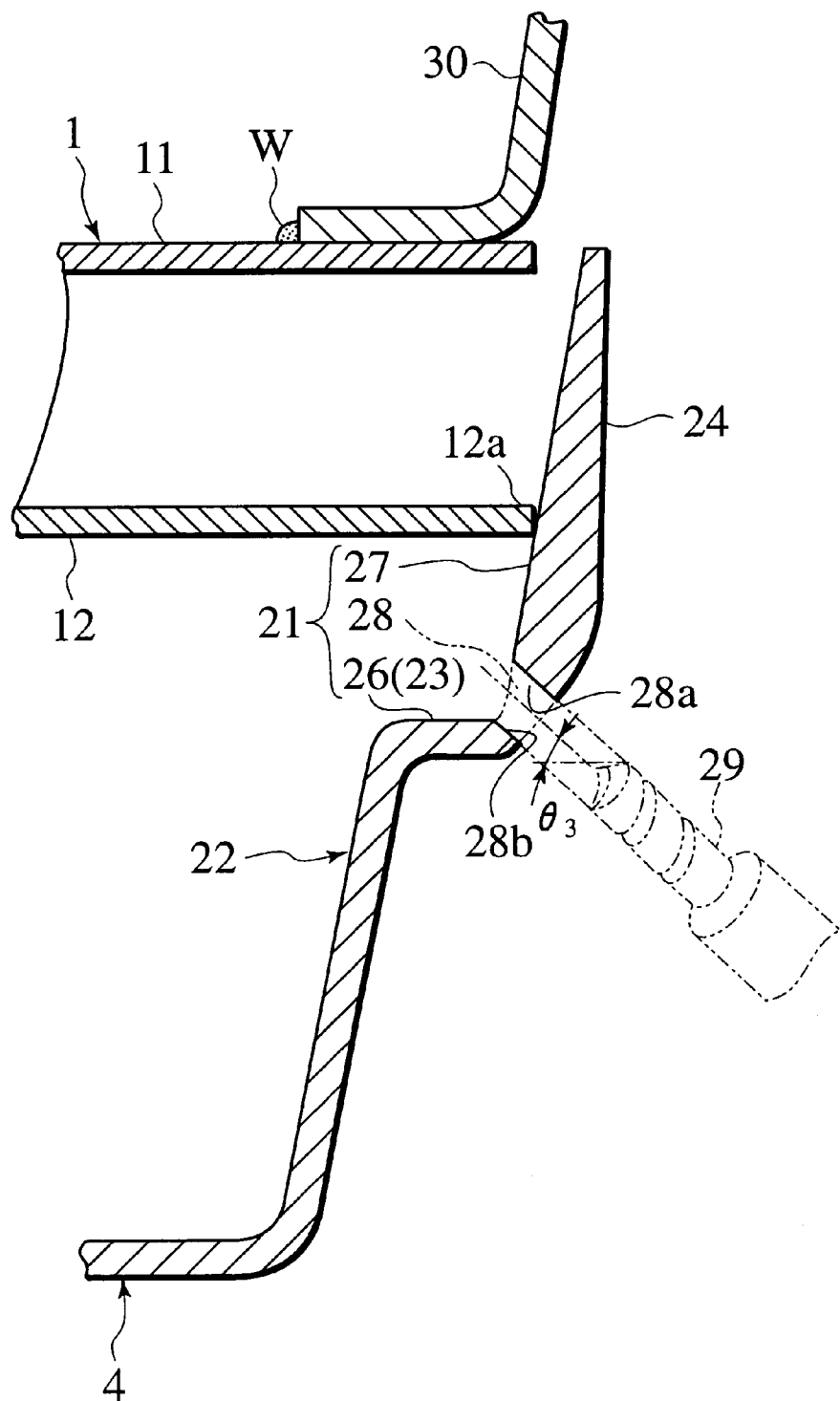
FIG. 5 is a sectional view showing one process for the assembling condition of FIG. 4.
Figure 6:
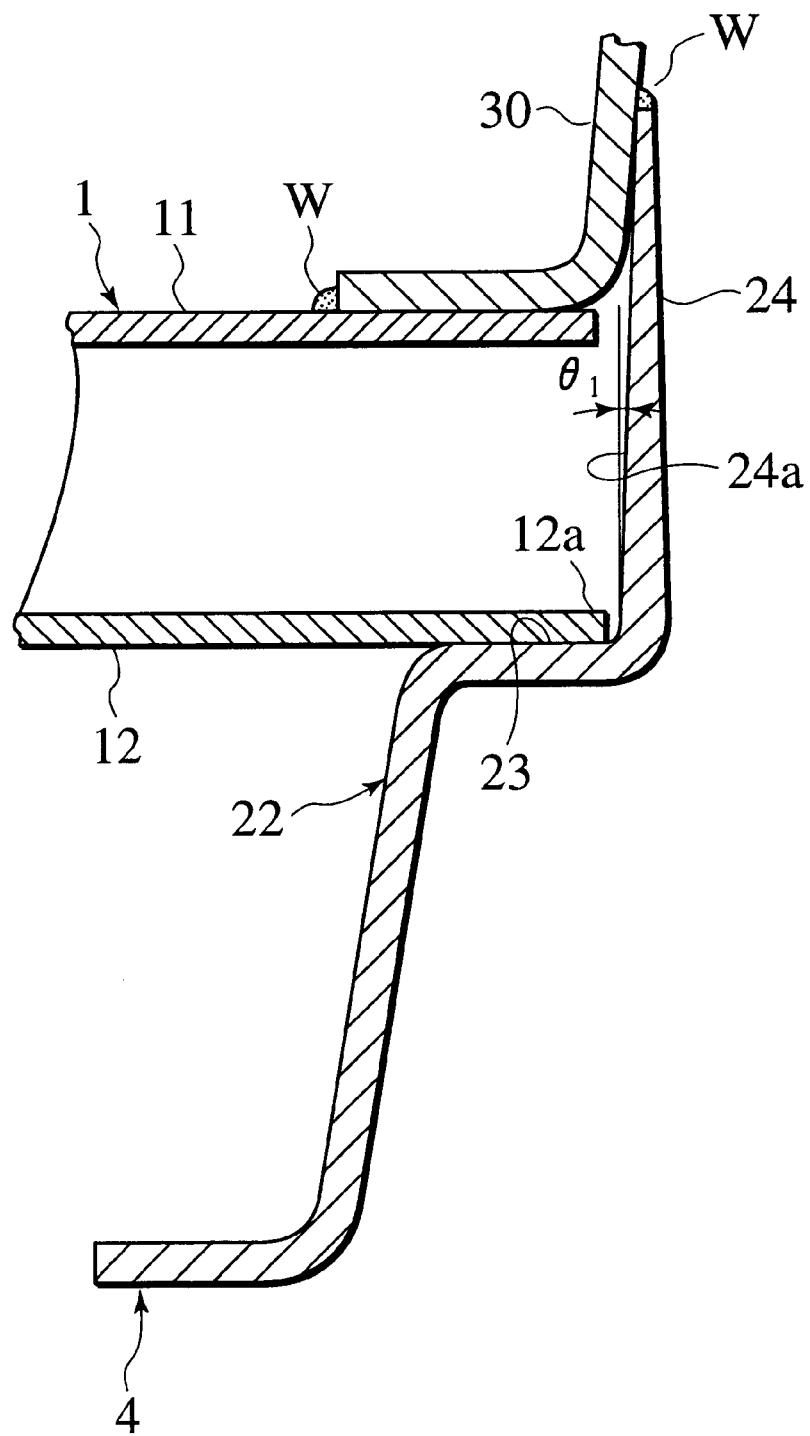
FIG. 6 is a sectional view of the dash panel and the reinforcement member, taken along a line B—B of FIG. 2.

As shown in FIGS. 4 and 5, each engagement part 21 has a flat part 26 (the part of shelf 23), a taper face 27 and a slot 28. The flat part 26 is arranged for abutment with the under face of the outer wall 15 of the dash panel 1. The taper face 27 is slanted to the flat part 26 at an open angle $\theta_2$ (FIG. 4) larger than an open angle $\theta_1$ (FIG. 6) of an inside generalized face 24a of the flange portion 24, allowing the engagement part 21 in slide contact with respective ends of the inner and outer walls 11, 12. The slot 28 is formed in a position between the flat part 26 and the taper face 27, for engagement with an end 12a of the outer wall 12 of the dash panel 1.

As shown in FIG. 5, this slot 28 is provided by using a drill 29 capable of drilling the reinforcement member 4 at a proper angle $\theta_3$ and a designated length. Note the angle $\theta_3$ substantially corresponds to one that bisects an angle interposed between the flat part 26 and the taper face 27. Owing to the drilling, the slot 28 is provided with an upper face 28a and an lower face 28b as slanted surfaces.

Additionally, the flange portion 24 is provided, in its part profiled by the taper face 27, with a wall thickness that is gradually thickened from the top to the flat part 26.

We now describe the assembling method of the above-mentioned dash panel 1 and the reinforcement member 4, including respective steps of mutually positioning, temporary fixing and welding them.

In the rough positioning, firstly, the dash panel 1 is perpendicularly piled on the reinforcement member 4 so that both ends (of the vehicle width direction) of the dash panel 1 in slide movement are guided on the inside generalized faces 24a of the flange portions 24 of the positioning parts 22 of the reinforcement member 4. After completing the rough positioning between the dash panel 1 and the reinforcement member 4, let the above-defined "width-direction" ends of the dash panel 1 slide downward along the inside generalized faces 24a and finally fall on the shelf portions 23 (only one shown in FIG. 6). On the dash panel's way to the self portions 23, the flange portions 24 are partially deformed outside due to the slide movement of the width-direction ends of the dash panel 1 on the taper faces 27 of the engagement parts 21. Subsequently, no sooner have both ends of the outer wall 12 of the dash panel 1 climbed over the taper faces 27 succeeding to the slots 28 than the ends of the outer wall 12 fall into the slots 28. Consequently, the outer wall 12 is brought into contact with the shelf portions 23 (i.e. the flat parts 26) through the "width-direction" ends, so that their tips respectively butt against the upper faces 28a of the slots 28 and the tips of the inner wall 12 abut against the taper faces 27, thereby accomplishing both mutual positioning and temporary fixing between the dash panel 1 and the reinforcement member 4 (see FIG. 4).

The union between the dash panel 1 and the reinforcement member 4 is basically accomplished by welding a frontal flange 4a between the arm parts 5 of the member 4 to the toe board 1A in mutual stack. Moreover, according to the embodiment, there are prepared a pair of dash side panels 30 (only one shown in FIGS. 4 to 6) which have been welded on the width-direction ends of the inner wall 11 of the dash panel 1 in advance and it is executed to unite respective tops of the flange portions 24 to the sidewalls of the so-prepared dash side panels 30 through welds W. While, in the slots 28 of the reinforcement member 4, the lower faces 28b are also welded to the under face of the outer wall 12 of the dash panel 1 through welds W. Thus, not only in the vehicle front/behind direction but also in the vehicle width direction, the dash panel 1 is united with the reinforcement member 4.

Meanwhile, the above floor panel 3 may be welded to the dash panel 1 in advance of the above-mentioned assembling procedure. Alternatively, this welding may be carried out after the union between the dash panel 1 and the reinforcement member 4 has been completed.

According to the embodiment, since the mutual positioning and temporary fixture between the dash panel 1 and the reinforcement member 4 are accomplished by pinching the width-direction ends of the dash panel 1 between the opposing engagement parts 21 on both sides of the reinforcement member 4, the welding operation can be carried out appropriately and easily.

Additionally, as both mutual positioning and temporary fixture do not require any positioning jigs or clamping jigs, it is possible to make a great contribution to the reduction in manufacturing cost of the vehicles.

Particularly, since the mutual positioning of the dash panel 1 and the reinforcement member 4 in both vertical and vehicle width directions is accomplished owing to the engagement of the width-direction ends of the dash panel 1 with the positioning parts 22 arranged on both width-direction ends of the reinforcement member 4 and each consisting of the shelf portion 23 and the flange portion 24, it is possible to enhance the stability of positioning.

Furthermore, since respective openings of the closed sections in the dash panel 1 in the vehicle width direction are closed by the flange portions 24, it is also possible to elevate the rigidity of side parts of the dash panel 1.

With the arrangement where each engagement part 21 is positioned between the shelf portion 23 and the flange portion 24 constituting the positioning part 22, the engagement of the engagement parts 21 can be accomplished at the same time of fitting the width-direction ends of the dash panel 1 to the positioning parts 22, thereby facilitating both of the positioning operation and the temporary fixing operation.

Above all, according to the embodiment, each positioning part 22 is substantially L-shaped in its plan view corresponding to the substantially L-shaped notch 25 on each end of the dash panel 1 in the vehicle width direction and the engagement parts 21 are formed in respective positions corresponding to the width-direction edge 25a and the front/behind-direction edge 25b constituting each notch 25. Thus, owing to the provision of the engagement parts 21, it is possible to strictly position the dash panel 1 and the reinforcement member 4 and temporary fix them to each other in the respective directions of up/down, vehicle width and front/behind, thereby further enhancing the stability in positioning and temporary fixing them.

Repeatedly, each of the engagement parts 21 includes the flat part 26 partially constituting the shelf portion 23 of the positioning part 22, the taper face 27 formed in the generalized inside face of the flange portion 24 and the slot 28 formed between the flat part 26 and the taper face 27 to engage with the width-direction end of the outer wall 12 of the dash panel 1. Thus, by making the width-direction ends of the dash panel 1 in slide contact with the taper faces 27 from the upside of the reinforcement member 4 and subsequently fitting the ends of the outer wall 12 of the dash panel 1 into the slots 28, then the dash panel 1 can be fixed to the reinforcement member 4 temporarily with no vertical deviation of the former from the latter.

Additionally, since the formation of the taper face 27 and the slot 28 in each engagement part 21 does not require any exclusive clipping member, the structure can be simplified thereby to enlarge the degree of freedom in design and the manufacturing cost is advantageous because of no increase in the number of elements.

In particular, since each slot 28 is formed between the flat part 26 and the taper face 27 to penetrate the reinforcement member 4, it is possible to smoothly lower the width-direction end of the outer wall 12 of the dash panel 1 and fit the above end into the upper face 28a of the slot 28 in assembling the dash panel 1 to the reinforcement member 4.

Additionally, the width-direction ends of the outer wall 12 are exposed outside the reinforcement member 4 through the slots 28 under the engagement condition between the outer wall 12 and the slots 28. Thus, the exposure allows the width-direction ends of the outer wall 12 to be welded to respective rims of the slots 28 easily. Note that, in other portions besides the engagement parts 21, it is difficult to weld the dash panel 1 to the positioning parts 22 due to their concealing the width-direction ends of the outer wall 12 from the outside. Especially in the embodiment, since there is ensured a wedge-shaped space S between the slanted lower face 28b of each slot 28 and the under face of the outer wall 12, it is possible to unite the outer wall 12 with the lower face 28b of the slot 28 through the weld W while making use of the space S.

In addition to the above welding between the slots 28 and the outer wall 12, the sidewalls of the dash side panels 30 on the dash panel 1 are also welded to the respective upper ends of the flange portions 24 on both sides of the reinforcement member 4 through the welds W. Therefore, the welding rigidity (strength) can be improved between the inner and outer walls 11, 12 of the dash panel 1 and the reinforcement member 4.

Furthermore, owing to the positioning of the welds W, the welding operations of both the upper ends of the flange portions 24 and the rims of the slots 28 can be completed while monitoring them from the outside of the vehicle, thereby improving the workability in welding.

Further, since the part of flange portion 24 including the taper face 27 is configured with a wall thickness gradually thickened from the top of the flange portion 27 toward the flat part 26, the vicinity of the slot 28 can be provided with high rigidity because of its thickened wall. Therefore, it is possible to enhance the stability in temporary fixing and the joint strength between the width-direction ends of the outer wall 12 of the dash panel 1 and the slots 28.

Although the invention has been described above by reference to one embodiment of the invention, the invention is not limited to the embodiment described above. Modifications and variations of the embodiment described above will occur to those skilled in the art, in light of the above teachings. For example, although the embodiment is directed to the vehicle body structure in the vicinity of the front compartment of the vehicle, the present invention is applicable to a vehicle body structure in the vicinity of a rear compartment of the vehicle. In the present specification, the dash panel may contain a partition wall which separates the vehicle cabin and a "power unit" accommodating chamber loaded with an engine, a motor (in case of an electric car), etc. in the rear compartment.

The entire contents of Japanese Patent Application No.11-254746 is incorporated herein by reference.

What is claimed is:

1. A vehicle body structure for vehicle, comprising:
   a dash panel to be arranged between a vehicle cabin for passengers and an outside of the vehicle cabin, the dash panel being made of an extrusion of a lightweight metal in a width direction of the vehicle to have a structure of closed sections, the dash panel having both an inner wall positioned inside of the vehicle cabin and an outer wall positioned outside of the vehicle cabin;
   a reinforcement member arranged under the dash panel to reinforce the dash panel from its underside, the reinforcement member being made of a casting of a lightweight metal and configured to interpose both ends of the dash panel in the width direction of the vehicle between both sides of the reinforcement member in the width direction of the vehicle; and
   engagement parts each provided between each of the ends of the dash panel and the reinforcement member, for engagement of the reinforcement member with the dash panel, thereby positioning the reinforcement member and the dash panel mutually and fixing the dash panel to the reinforcement member temporarily.

2. The vehicle body structure of claim 1, wherein
   the reinforcement member is provided, on both sides thereof in the width direction of the vehicle, with a pair of positioning parts each of which has a shelf portion for mounting each of the ends of the dash panel thereon and a flange portion formed to rise from the shelf portion; and
   each one of the engagement parts is arranged in the flange portion and also arranged between the shelf portion and the flange portion.

3. The vehicle body structure of claim 2, wherein the each one of the engagement parts comprises:
   a flat part composed of a part of the shelf portion, for mounting the outer wall of the dash panel thereon;
   a taper face formed on the flange portion to incline with an open angle larger than a flange portion's open angle for defining a generalized inside face of the flange portion, the taper face being configured for contact with the inner wall and the outer wall of the dash panel in its slide movement on the flange portion of the reinforcement member; and
   a slot formed between the flat part and the taper face, for engagement with one end of the outer wall in the width direction of the vehicle.

4. The vehicle body structure of claim 3, wherein the slot is formed to penetrate the reinforcement member obliquely at an angle substantially bisecting an angle defined by the flat part and the taper face, whereby the slot has an upper face and a lower face both inclined to the flat part.

5. The vehicle body structure of claim 3, wherein the flange portion's part including the taper face is configured with a wall thickness gradually thickened from a top of the flange portion toward the flat part.

6. The vehicle body structure of claim 2, wherein
   the dash panel has substantially L-shaped notches formed on both ends of the dash panel in the width direction of the vehicle;
   the positioning parts on both sides of the reinforcement member are formed to have substantially L-shaped configurations in their plan view, corresponding to the notches; and
   the engagement parts are arranged in respective positions corresponding to one edge defining each of the notches in the width direction of the vehicle and another edge defining each of the notches in a front and behind direction of the vehicle.

7. The vehicle body structure of claim 3, further comprising a pair of dash side panels joined to both ends of the inner wall of the dash panel in the width direction of the vehicle, wherein
   both ends of the outer wall of the dash panel in the width direction of the vehicle are fixed to respective rims of the slots through welds; and
   respective upper ends of the flange portions on both sides of the reinforcement member are fixed to respective side faces of the dash side panels through welds.

8. A vehicle body structure for vehicle, comprising:
   a dash panel to be arranged between a vehicle cabin for passengers and an outside of the vehicle cabin, the dash panel being made of an extrusion of a lightweight metal in a width direction of the vehicle to have a structure of closed sections, the dash panel having both an inner wall to be positioned on the side of the vehicle cabin and an outer wall to be positioned outside of the vehicle cabin;
   a reinforcement member to be arranged under the dash panel to reinforce the dash panel from its underside, the reinforcement member being made of a casting of a lightweight metal and configured to interpose both ends of the dash panel in the width direction of the vehicle between both sides of the reinforcement member in the width direction of the vehicle; and
   means for engaging the reinforcement member with the dash panel, the means being provided between the ends of the dash panel and the reinforcement member, thereby positioning the reinforcement member and the dash panel mutually and fixing the dash panel to the reinforcement member temporarily.

9. A vehicle comprising:

a dash panel to be arranged between a vehicle cabin for passengers and an outside of the vehicle cabin, the dash panel being made of an extrusion of a lightweight metal in a width direction of the vehicle to have a structure of closed sections, the dash panel having both an inner wall to be positioned inside of the vehicle cabin and an outer wall to be positioned outside of the vehicle cabin;

a reinforcement member arranged under the dash panel to reinforce the dash panel from its underside, the reinforcement member being made of a casting of a lightweight metal and configured to interpose both ends of the dash panel in the width direction of the vehicle between both sides of the reinforcement member in the width direction of the vehicle; and engagement mechanisms for positioning the reinforcement member and the dash panel mutually and fixing the dash panel to the reinforcement member temporarily, each of the engagement mechanisms being arranged between each of the ends of the dash panel and the reinforcement member.

10. A vehicle comprising:

a dash panel to be arranged between a vehicle cabin for passengers and an outside of the vehicle cabin, the dash panel being made of an extrusion of a lightweight metal in a width direction of the vehicle to have a structure of closed sections, the dash panel having both an inner wall positioned inside of the vehicle cabin and an outer wall positioned outside of the vehicle cabin;

a reinforcement member to be arranged under the dash panel to reinforce the dash panel from its underside, the reinforcement member being made of a casting of a lightweight metal and configured to interpose both ends of the dash panel in the width direction of the vehicle between both sides of the reinforcement member in the width direction of the vehicle; and means for positioning the reinforcement member and the dash panel mutually and fixing the dash panel to the reinforcement member temporarily, the means being arranged between both ends of the dash panel in the width direction of the vehicle and the reinforcement member.

* * * * *